(12) United States Patent
Horstmann

(10) Patent No.: US 9,101,089 B2
(45) Date of Patent: Aug. 11, 2015

(54) AGRICULTURAL ROUND BALER

(71) Applicant: Maschinenfabrik Bernard Krone GmbH, Spelle (DE)

(72) Inventor: Josef Horstmann, Ibbenbüren (DE)

(73) Assignee: Maschinenfabrik Bernard Krone GmbH, Spelle (DE)

( * ) Notice: Subject to any disclaimer, the term of this patent is extended or adjusted under 35 U.S.C. 154(b) by 0 days.

(21) Appl. No.: 14/541,348

(22) Filed: Nov. 14, 2014

(65) Prior Publication Data

US 2015/0068181 A1 Mar. 12, 2015

Related U.S. Application Data

(62) Division of application No. 13/571,387, filed on Aug. 10, 2012, now Pat. No. 8,910,460.

(30) Foreign Application Priority Data

Aug. 10, 2011 (DE) .......................... 10 2011 109 899

(51) Int. Cl.
| | |
|---|---|
| *G06F 7/70* | (2006.01) |
| *A01D 37/00* | (2006.01) |
| *A01F 15/07* | (2006.01) |
| *A01F 15/10* | (2006.01) |

(52) U.S. Cl.
CPC ............ *A01D 37/00* (2013.01); *A01F 15/0705* (2013.01); *A01F 15/0715* (2013.01); *A01F 15/106* (2013.01); *A01F 2015/076* (2013.01); *A01F 2015/0735* (2013.01)

(58) Field of Classification Search
USPC .......... 701/50; 100/5, 39, 40, 88, 142; 56/341
See application file for complete search history.

(56) References Cited

U.S. PATENT DOCUMENTS

| | | | |
|---|---|---|---|
| 2011/0023442 A1* | 2/2011 | Herron et al. .................... | 56/341 |
| 2013/0000495 A1* | 1/2013 | Posselius et al. ............... | 100/40 |

* cited by examiner

*Primary Examiner* — Kim T Nguyen
(74) *Attorney, Agent, or Firm* — Gudrun E. Huckett

(57) ABSTRACT

In a method for operating a round baler, the harvested crop flow is controlled at any time of the bale forming process by time control with the control and governing device of the round baler, based on a stored theoretical minimum time for pressing a harvested crop bale defined by predetermined parameters and based on actually determined harvested crop parameters, such that the harvested crop bale defined by the predetermined parameters is produced at maximum baler utilization in a nominal press time determined for the harvested crop bale.

3 Claims, 5 Drawing Sheets

AGRICULTURAL ROUND BALER

CROSS-REFERENCE TO RELATED APPLICATIONS

This application is a divisional application of U.S. patent application Ser. No. 13/571,387 having a filing date of 10 Aug. 2012, the aforesaid patent application claiming a priority date of 10 Aug. 2011, based on prior filed German patent application No. 10 2011 109 899.6, the entire contents of the aforesaid United States patent application and the aforesaid German patent application being incorporated herein by reference.

BACKGROUND OF THE INVENTION

The invention relates to an agricultural round baler for forming round bales of harvested crop, the round baler comprising a press chamber that is provided with a rearward outlet for ejecting the completed round bale and with pressing devices that cause the harvested crop to rotate; a harvested crop pickup device; a cutting and/or conveying device; a storage chamber that adjoins the cutting and/or conveying device and reaches to an inlet area of the press chamber. The storage chamber, in storage phases of the pressing operation, receives and stores harvested crop. A control or governing device for controlling devices for interrupting or releasing crop transfer from the storage chamber to the press chamber is provided. A device for tying the completed round bale with tying material in the pressing chamber is provided.

The invention moreover concerns a method for controlling the flow of harvested crop in such an agricultural round baler.

Round balers are often employed for processing stalk crop. They are characterized by a relatively simple configuration and minimal drive output in comparison to large square balers. A disadvantage is however that upon processing with a round baler there is the problem that during the processing steps of tying and ejecting the completed bale, it is not possible to continue to supply harvested crop material. The method is carried out in a stepwise fashion. This means that in a first step the harvested crop, as the baler travels across the field, is picked up, shaped to a round bale, and compressed. In a second step, by stopping the tractor, the pickup of harvested crop is interrupted, the bale is compressed to the final state, and then it is tied with yarn or a net and ejected from the press chamber. The tying process and the ejection require a significant amount of time that may even reach the duration of the preceding bale forming step. For a long time, there have been attempts to avoid these undesirable interruptions in operation in order to thus increase the baler performance significantly.

In order to eliminate the disadvantages of the stepwise method, a baler must be developed which is able to continuously pick up harvested crop. In order to achieve a continuous material supply, the harvested crop must be stored intermediately during the tying and ejecting interval. At the beginning of a new working cycle, within the shortest possible time, the intermediately stored material must be supplied to the press chamber while simultaneously newly picked-up material continues to flow. In the various proposals for solving this problem, two basic systems have been developed.

In the "multi-chamber" basic principle, as disclosed inter alia in the publication DE 27 04 982 A1 and DE 10 2005 020 777 A1, the main press chamber has upstream thereof a smaller pre-compression chamber in which during the tying process the harvested crop that is continuously being picked up is wound and compressed to a pre-bale. After the main press chamber has been emptied, this pre-bale is to be transferred from the antechamber into the main chamber, while simultaneously harvested crop continues to be supplied, in order to be completed in the main chamber. In particular the transfer of the pre-bale into the main chamber during which the pre-bale should not lose its shape and compression state is in practice very problematic and requires an extremely high constructive expenditure.

Continuously operating round balers operating based on the afore described basic principle of at least two pressing and winding chambers therefore have not yet surpassed the experimental stage, most likely because of these problems.

In the various proposals for continuous round balers that operate according to the "single-chamber" basic principle, the harvested crop that is picked up upon further travel during bale formation is supplied to a storage chamber that is positioned upstream of the press chamber. A problem in connection with such continuously operating bale presses, as disclosed inter alia in EP 0 350 514 A1 and DE 199 32 336 A1, is however the removal of the harvested crop that has been collected in the storage chamber. When removal from the storage chamber takes place too slowly while at the same time additional harvested crop is supplied as a result of continued travel of the baler, the performance limits of the baler are reached quickly and an uninterrupted continuous operation without reduction of the travel speed is not possible. A further disadvantage resides in that the crops that has been pre-compressed within the storage chamber to a limited extent after transfer into the empty press chamber will expand again and therefore desired bale densities will no be achieved.

Continuously operating round balers according to the single-chamber basic principle have reached marketability but, in particular because of the unsatisfactory performance, they have not found acceptance in practice.

Based on this, it is an object of the present invention to provide an improved continuously operating round baler that eliminate the disadvantages of the prior art and further develops the prior art devices in an advantageous manner.

SUMMARY OF THE INVENTION

In accordance with the present invention, this is achieved in regard to the round baler in that the storage chamber is embodied as a flat shaping and pressing channel for the harvested crop that is being supplied in the storage phase of the baler operation, wherein the channel has at least temporarily a tapering cross-section in the flow direction of the harvested crop with a variable height at least at one end of the channel.

In one embodiment, the channel of the storage chamber is laterally delimited by sidewalls and is delimited in upward and downward directions by drivable conveyers.

In another embodiment, the storage chamber has at least one height-adjustable bottom conveyor that is height-adjustable at the end facing the press chamber.

In one embodiment, in the inlet area of the press chamber, the storage chamber has correlated therewith a conveying member that, at the same time, is embodied as a pressing element of the press chamber.

According to another embodiment, the conveying member, by means of a correlated cover element, acts additional as a blocking device for preventing passage of harvested crop from the storage chamber to the press chamber.

According to one embodiment, for improving the transfer of harvested crop from the storage chamber to the press chamber, the conveying and blocking device is arranged to be movable in such a way that at least phase-wise an inlet opening of the press chamber is expanded for the harvested crop.

According to another embodiment, at the beginning of the bale forming process, the press chamber is embodied as a starting press chamber with a volume that is reduced relative to the volume of the press chamber at the time of bale completion.

According to another embodiment, the volume of the starting press chamber preferably corresponds to the maximum holding capacity (storage capacity) of the storage chamber.

The control and governing device of the round baler controls at least the bottom conveyer that delimits the storage chamber in downward direction in such a way that at the beginning of the storage phase the bottom conveyor reverses its conveying direction and, in this way, the harvested crop contained in the storage chamber is combined in a direction opposite to the flow direction with the harvested crop that is additionally supplied by the conveying and cutting device to the storage chamber.

According to another embodiment, the control and governing device, at the latest after the combining phase of the harvested crop caused by reversal of the conveying direction, at least by reversal of the bottom conveyor, initiates an end-side displacement of the bottom conveyor so that the storage chamber assumes a configuration that is wedge-shaped and tapers in the direction of the inlet of the press chamber that is then increasingly filled by the conveying and cutting device with harvested crop, wherein the harvested crop as a result of the wedge shape is subjected to pre-compression.

At a point in time that is controlled based on time and/or based on torque and/or filling level, the tapering of the storage chamber in the direction of the inlet of the press chamber is canceled so that with continuous filling a uniform pre-compression is achieved.

According to the invention, the bale press chamber has arranged downstream thereof a bale wrapping device and/or a bale discharge device.

According to the method of the present invention, the problem is solved in that, on the basis of a saved theoretical minimum time for pressing a harvested crop bale that is defined by predetermined parameters and with consideration of the actual determined harvested crop parameters, the control and governing device of the round baler controls at any time of the bale forming process the flow of harvested crop in a time-wise fashion such that in the determined nominal pressing duration the predefined bale is produced at maximum baler utilization (maximum baler performance).

As a function of the actual bale diameter during bale growth, the control and governing device of the round baler, by continuous time-based nominal value/actual value comparison, generates and supplies to the drive unit or the tractor vehicle a nominal value signal for the travel speed, whereupon the travel speed is preferably automatically controlled.

The continuously operating round baler according to the present invention has a storage chamber that is upstream of the press chamber for storing harvested crop. The storage chamber extends across the entire width of the press chamber and is delimited in upward direction and downward direction by conveyors; the conveyors, with respect to their conveying action on the harvested crop, have a controllable conveying speed and are also reversible with regard to the conveying direction. At least the bottom conveyor is also movable at its end that is facing the press chamber with respect to height. Because of the pivoting action of at least the bottom conveyor about an axis that is proximal to the harvested crop pickup device, the storage chamber can be variably adjusted from a wedge-shaped configuration that tapers toward the inlet of the press chamber to at least a rectangular configuration with parallel top and bottom conveyors.

In connection with an also height-adjustable press roller of the press chamber arranged in accordance with the invention, it is possible to obtain pre-compressed storage quantities that have been unknown up to now while at the same time shortest possible transfer times of the storage chamber packet into the press chamber are realized. The height-adjustable press roller is a component of the pressing device of the press chamber and is used primarily as such in its upper position. Such rollers arranged in the lower press chamber area are also known generally as starter rollers because, at the beginning of a bale forming process, they are designed to support rotation and thus winding of the harvested crop as early as possible. In the continuous round baler according to the invention the starter roller however acts phase-wise in accordance with the invention as a conveying member for transfer of the harvested crop from the storage chamber into the press chamber. In addition, the roller is particularly advantageously provided at its circumference over sections thereof with a cover such that, when the bottom conveyor of the storage chamber is lowered, it closes off the inlet from the storage chamber to the press chamber at least partially.

With this particular combination, the storage chamber can be utilized completely up to the inlet without there being the risk that the starter roller during the tying and ejection phase pulls the harvested crop from the storage chamber into the press chamber.

Only once the press chamber after completed ejection of the completed bale is at least almost completely closed again, the press roller is lowered into the lower position together with the cover element that is acting as a blocking device and assists now with its preferably particularly non-slip surface the transfer of the storage contents into the press chamber, with top and bottom conveyors of the storage chamber conveying simultaneously at high speed in the direction toward the press chamber. With the simultaneous end-side lowering of the bottom conveyor and of the press roller, an expanded inlet to the press chamber enabling optimal transfer of the intermediately stored harvested crop packet is provided.

Only with the combination according to the invention of the lowerable bottom conveyor with the press roller that can also be lowered and in this way becomes a transfer conveyor, an especially fast but at the same time gentle transfer of the storage chamber packet into the pressing device of the press chamber can be realized. With optimal adjustment of the speeds of the conveyors and the pressing device relative to each other, it is thus achieved that the entire intermediately stored pre-compressed crop packet can be transferred, practically without dissolving or unraveling, into the pressing device; the pressing device then causes the bale to rotate and at the same time wraps it with the newly received incoming harvested crop for continuing the bale formation.

Basically, it is of no consequence in this context which of the known embodiments is acting as the pressing device. As a result of the particularly excellent conveying action, a pressing device with rod-chain or belt-and-slat conveyors is however particularly advantageous.

In a particularly advantageous embodiment, the baler according to the invention is provided with a semi-variable press chamber. Such a configuration of the press chamber of a round baler is known to a person of skill in the art with respect to almost all essential details and advantages and is disclosed inter alia in DE 10 2004 023 696 A1, for example. The main reason for failure of the prior attempts with continuous balers was the transfer of the large intermediately stored quantities of harvested crop into the press chamber. Balers with variable press chambers are entirely unsuitable because they do not have an initial or starting press chamber that can receive the large quantity quickly. The fixed chamber balers that are then left as an alternative have the problem that the possibly already pre-compressed harvested crop packet upon transfer into the large free space of the empty press chamber may expand again or completely dissolve or unravel. Fast overfilling of the press chamber and unsatisfactory bale density are the result. The afore described features of the invention already provide a solution to this problem. The use of a bale press with a semi-variable press chamber increases even more the operative safety and provides additional advantages.

In that, in comparison to a variable baler, such a baler is provided with a starting press chamber that is however significantly smaller than the possible maximum press chamber volume, on the one hand, a quick pickup of the entire intermediately stored harvested crop is possible but, on the other hand, the harvested crop has no space to expand and to unravel.

With proper adjustment of the storage chamber volume and the starting chamber volume of the pressing device, an optimal bale formation with maximum throughput is ensured.

In particular in combination with a semi-variable press chamber a pre-compression as high as possible of the intermediately stored harvested crop is thus particularly advantageous because the pre-compression is maintained upon transfer into the press chamber and the directly following bale formation. With these special features of the baler according to the invention it is possible, with the same storage chamber size, to intermediately store a significantly larger material quantity of harvested crop or to design the storage chamber and thus the entire baler to be smaller and less expensive.

Further particularly inventive features in the course of the continuous baler operation of the baler according to the invention provide the condition for a significantly improved storage filling level and pre-compression.

Controlled by a control and governing device of the baler, the various phases of the harvested crop flow are advantageously performed in accordance with the following method.

During the normal pressing phase, the harvested crop that has been picked up by the pickup device is passed at least by the bottom conveyor of the storage chamber directly to the press chamber; it is optionally cut beforehand by means of a conveying and cutting device disposed between pickup device and storage chamber. The bottom conveyor and the pressing and conveying member (starter roller) are positioned in the upper position (normal position). After reaching the desired or maximum bale parameters with regard to diameter and density, the conveyors of the storage chamber are stopped and prevent thus further supply of crop into the press chamber. The storage phase begins. Accordingly, in the press chamber the bale tying action can be performed.

As a result of the conveying direction reversal of the storage chamber conveyors that follows now, the crop contained in the storage chamber is combined at the inlet side of the storage chamber with the incoming crop that is continuously supplied by the pickup device or the conveying and cutting device; in this way, net inclusions in the bale chamber (press chamber) are prevented and a pre-compression of the harvested crop is achieved already shortly behind the conveying and cutting rotor. The conveying and cutting rotor continues to press the harvested crop further into the storage chamber that, for providing an excellent pre-compression, is particularly advantageously of a wedge shape that tapers toward the press chamber. The drive action of the storage chamber conveyors can be controlled as a function of various parameters and/or sensed baler conditions. In case of dry straw, for example, a further reversal operation for assisting the compression action is conceivable while in case of wet grass that is cut to short lengths, an appropriate stepped control or continuous control of the conveying action in the direction of the press chamber is advantageous in order to avoid jamming or overloading of the conveying and cutting rotor drive.

Controlled by the same parameters, a further particularly advantageous step of the method follows. The bottom conveyor is lowered. The storage chamber conveyors extend now parallel to each other or form a storage chamber that is slightly widened in the direction toward the press chamber. With this step, on the one hand, an undesirable further increase of the pre-compression pressure in the storage chamber is avoided and, on the other hand, the storage volume is significantly expanded.

In a further embodiment of the invention, a control of the afore described functions additionally based on the advance of the tying process is conceivable with which filling of the storage chamber that is too fast or that is insufficient is avoided. According to a further embodiment of the invention, for further optimization of the process steps and thus of the optimal baler utilization, the control and governing device of the baler can provide a nominal value signal which is either indicated or displayed to the driver (operator) so that the driver/operator can react accordingly or preferably the signal is directly acting on the tractor control so that the travel speed of the tractor is automatically controlled/adjusted.

In the terminal phase of the storage process, the harvested crop in the filled storage chamber is retained by the cover element of the starter roller at the inlet of the press chamber; after lowering of the bottom conveyor with simultaneous lifting of the starter roller position, the cover element is activated. As soon as the tying process has been completed, the bale chamber opens and the bale is ejected. Already during closing of the bale chamber, lowering of the starter roller together with correlated cover element occurs so that the maximum passage from the storage chamber to the press chamber is released. The start signal for quickly emptying the storage chamber is given when the bale press chamber is completely closed and effects the drive action of the storage chamber conveyors in the direction of the bale press chamber. The conveying speed of the storage chamber conveyors is matched such to the revolving speed of the pressing device that the pre-compressed harvested crop packet coming from the storage chamber will not be pulled apart. The pre-compressed harvested crop packet is received, because of the optimal transfer from the storage chamber to the press chamber, as a complete packet by the pressing device and forms the core for the subsequent bale formation with the incoming harvested crop. Upon completed quick emptying of the storage chamber, the starter roller and the bottom conveyor are moved immediately into their upper positions in order to ensure for the new pressing cycle an optimal bale formation with minimal chamber inlet opening.

In a further embodiment of the invention, an embodiment of a continuous round baler with a control and governing device is conceivable which, based on a predetermined minimal cycle time or based on a minimum cycle time computed from determined harvested crop parameters in combination with bale parameters that can be preset, such as bale diameter, bale density, bale weight or type of tying, can control the entire baling cycle such that a maximum baler utilization is achieved.

The basis of the calculations in this connection are the physical limits of pre-compression of the harvested crop. For this purpose, in several series of tests minimum cycle times for producing a high-quality round bale with various kinds of harvested crop and bale parameters were determined and thus serve as a basis. Shorter cycle times are technically possible but cause deterioration of the bale density and have thus disadvantageous effects on the bale quality and on throughput of the baler.

The control and governing device of such a round baler according to the invention controls at any point in time of the bale forming process the entire harvested crop flow from pickup of the harvested crop up to the bale discharge position in such a way by a time-based control that in the respective nominal pressing time a bale of the desired parameters with maximum baler utilization is produced. When in this connection the control and governing device of the round baler supplies a nominal value signal for the travel speed to the drive unit, in case of a self-propelled unit, or to the tractor vehicle, in case of a tractor-trailer unit, whereupon the travel speed is preferably automatically controlled, an optimal performance and surface area output of the continuous round baler according to the invention is achieved with maximum driver relief.

In a further particularly advantageous embodiment of the round baler according to the invention, the baler is provided with a bale wrapping device downstream of the press chamber. The bale wrapping device is either embodied as a trailing device or is preferably mounted on a common carriage, as is known in the filed of balers. Accordingly, with the round baler according to the invention, it is possible for the first time to press bales, wrapped them in film, and deposit them on the field in a continuous manner and in a single working step.

DESCRIPTION OF THE PREFERRED EMBODIMENTS

Figure 1:
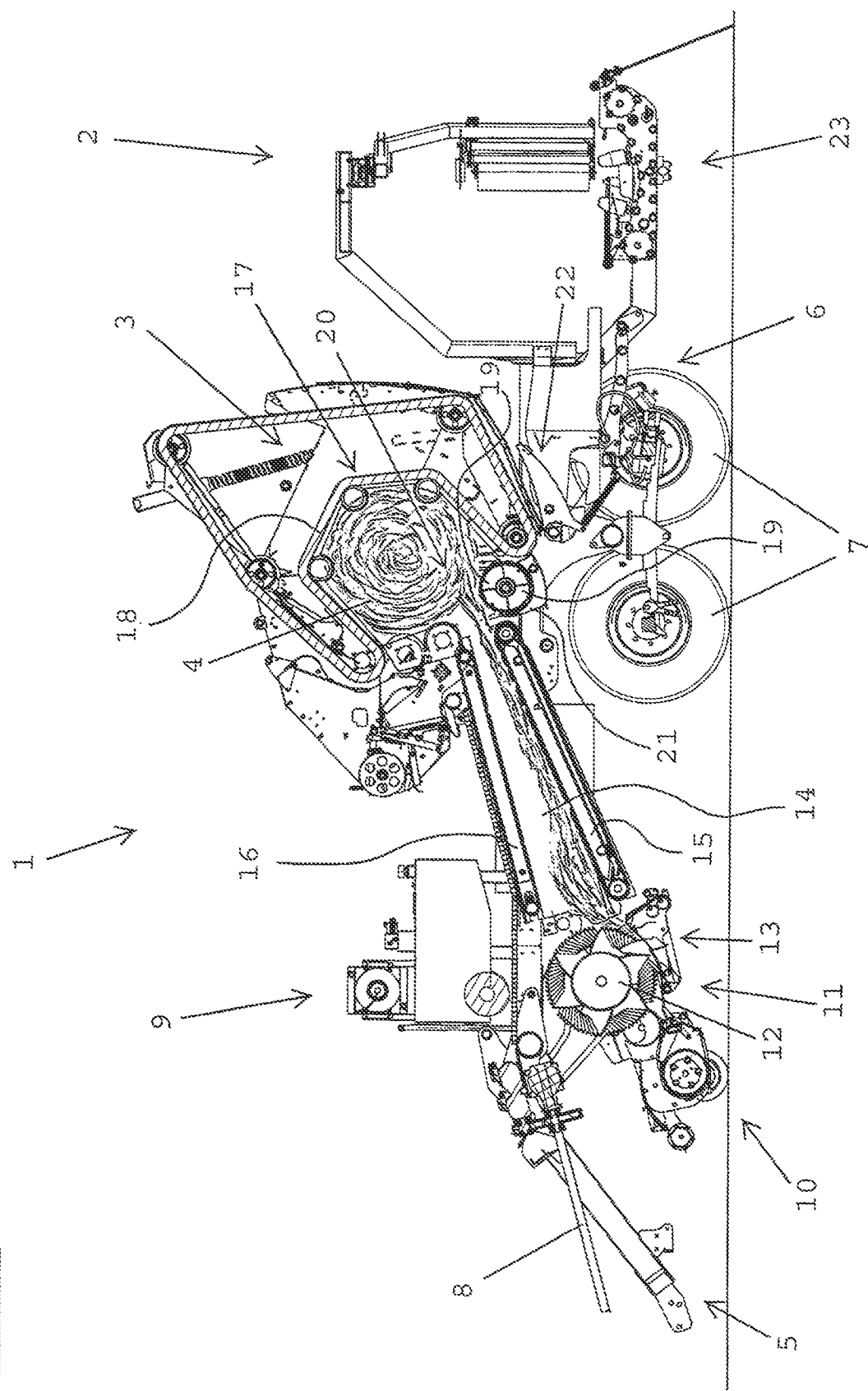
FIG. 1 is a schematic side view of a continuously operating round baler according to the invention in an operating position that represents the normal pressing (baling) operation.

The FIGS. 1 to 5 show the same embodiment of a continuously operating round baler 1 in different operating phases. The round baler 1 of the illustrated embodiment is advantageously provided with a directly attached bale wrapping device 2 for wrapping the round bales 4 received from the bale press chamber 3 with film and subsequent depositing of the bales 4 on the field. Both units are supported on a common carriage 6 that is connectable by shaft 5 with a tractor, in particular with an agricultural tractor, and is supported by wheels 7 on the ground. The drive action of the entire machine combination is realized by means of a drive shaft 8 to be coupled to the tractor; the drive energy of the drive shaft 8 is distributed or branched for driving the on-board hydraulic system 9, on the one hand, and, on the other hand, the mechanically driven components.

The continuously operating round baler 1 of the illustrated embodiment is designed as a collecting baler and has at the leading end a harvested crop pickup device 10, referred to as pickup for short, for picking up the harvested crop that is usually lying in swaths on the ground. Downstream thereof, in the flow direction of the harvested crop viewed in a direction opposite to the travel direction F, a conveying and cutting device 11 is provided that receives the harvested crop from the pickup 10 and conveys it further by means of intake rotor 12; optionally, the harvested crop is at the same time cut by switchable sets of cutting knives 13. Along the further path of the harvested crop, between the conveying and cutting device 11 and the bale press chamber 3, a storage chamber 14 is arranged which either intermediately stores the harvested crop received from the conveying and cutting device 11 or passes the harvested crop into the press chamber 3.

Figure 2:
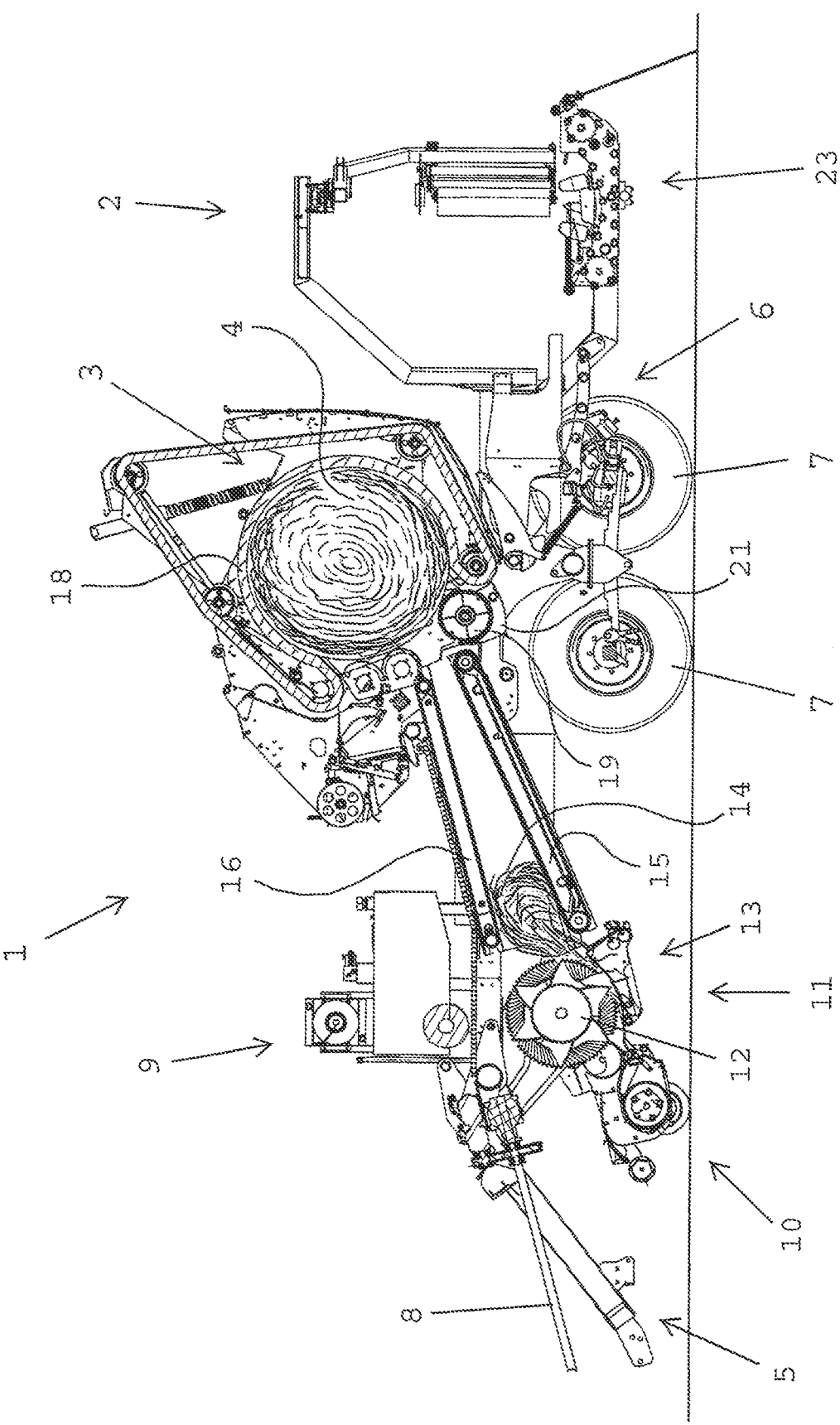
FIG. 2 is a schematic side view of the round baler of FIG. 1 in an operating position that represents the initial phase of the storage operation wherein the bottom conveyor is in an upper position.
Figure 3:
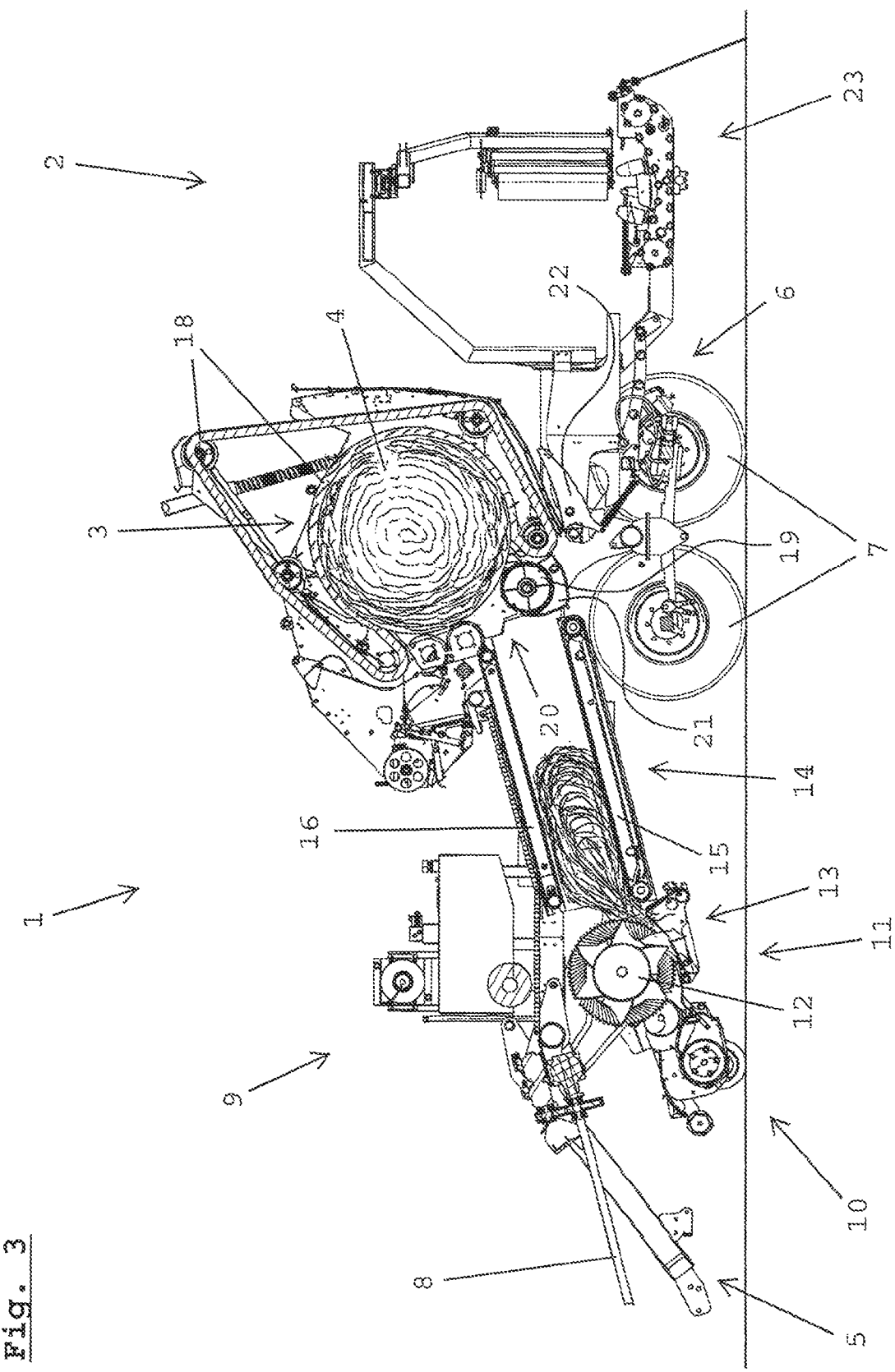
FIG. 3 is a schematic side view of the round baler of FIG. 1 in an operating position that represents a further phase of the storage operation wherein the bottom conveyor is in a lowered position.
Figure 4:
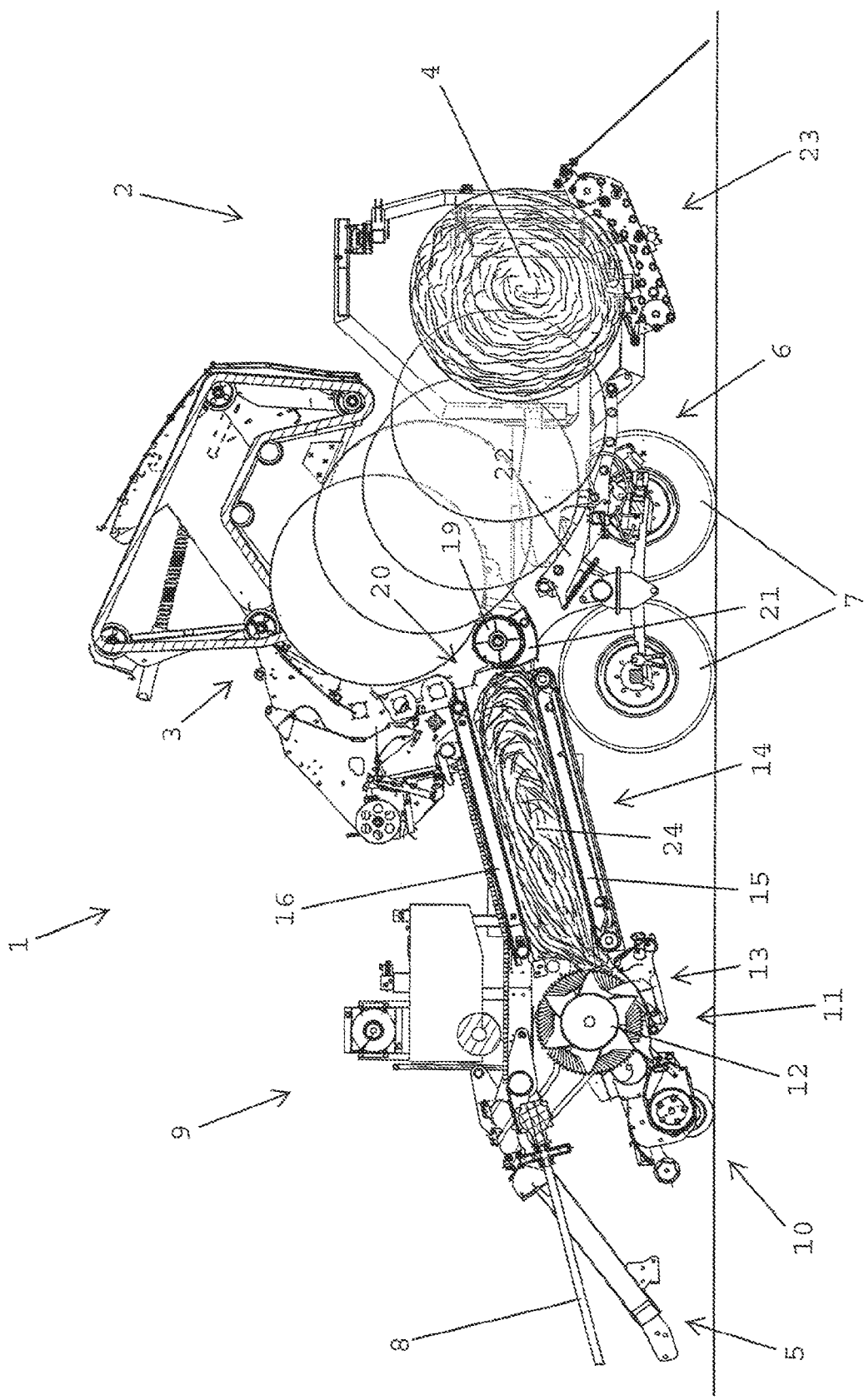
FIG. 4 is a schematic side view of the round baler of FIG. 1 in an operating position that shows the storage operation in the end phase.
Figure 5:
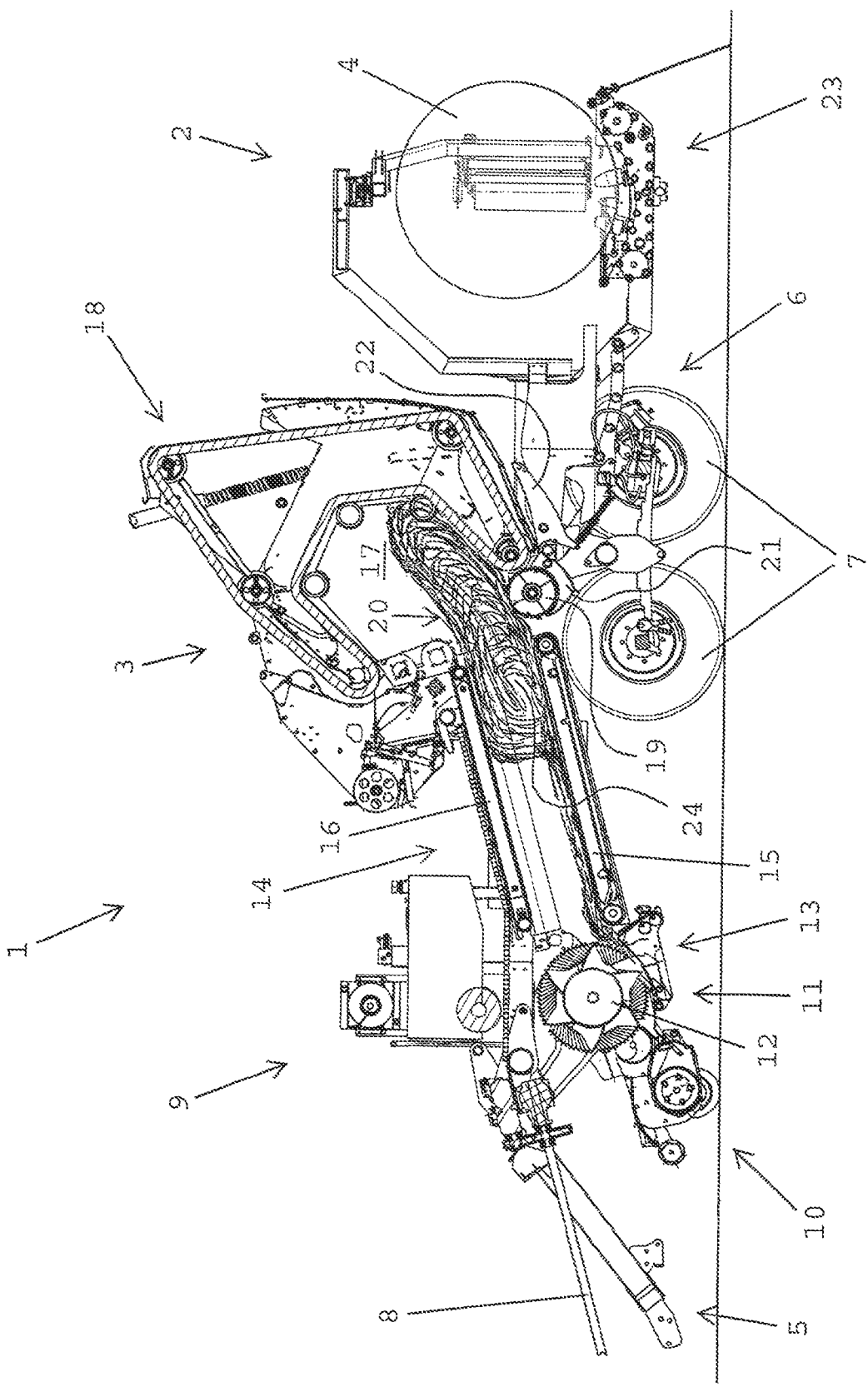
FIG. 5 is a schematic side view of the round baler of FIG. 1 in an operating position that represents the quick emptying action of the storage chamber with lowered starter roller.

The storage chamber is delimited laterally by sidewalls and in the upward and downward directions by conveyors 15, 16 extending across the entire length of the storage chamber and defining a channel. The conveyors 15, 16 are preferably embodied as belt conveyors with followers, as in the illustrated embodiment, or are configured as rod-chain conveyors or belt-and-slat conveyors. Embodiments with conveying rollers are also conceivable. The lower bottom conveyor 15 is pivotably supported at its leading end near the conveying and cutting device 11 in such a way that by height adjustment of the bottom conveyor 15 at the rear end, in the flow direction of the harvested crop, the storage chamber 14 can be changed with regard to its shape. FIGS. 1 and 2 show the bottom conveyor 15 in the upwardly displaced position so that a configuration of the storage chamber 14 which tapers in a wedge shape in the flow direction of the harvested crop is effected. In the lower position of the bottom conveyor 15, as illustrated in FIGS. 3 to 5, the bottom conveyor 15 and the upper top conveyor 16 of the storage chamber 14 extend at least parallel relative to each other or in such a way that the storage chamber 14 widens slightly at the end that is facing the press chamber 3.

In a further embodiment, the change of the storage chamber shape can be realized also by an additional adjusting possibility of the upper conveyor 16 but this requires disadvantageously an additional constructive expenditure and incurs extra costs.

In the direction of flow of the harvested crop downstream of the storage chamber, the bale press chamber 3 of the round baler 1 is arranged. In the round baler 1 of the illustrated embodiment, the press chamber 3 is designed advantageously as a semi-variable press chamber 3. In contrast to a completely variable press chamber, this press chamber 3 has an initial press chamber, i.e., a starting press chamber 17, and the baler operates according to the system of a fixed chamber baler up to the diameter of this starting press chamber 17. Upon further supply of harvested crop, the pressing device 18 expands according to the system of a variable press chamber in outward direction and enables in this way the formation of bales of variable sizes that surpass the diameter of the starting press chamber 17. As an additional element correlated with the press chamber 3 in the lower area of the press chamber 3 a roller is arranged which, generally known in the art, is referred to as starter roller 19. According to the invention, the starter roller however also takes over tasks as a conveying member 19 and is therefore also referred to, at least at times, as conveying member. The starter roller 19 is arranged such that it forms the lower boundary of the harvested crop inlet 20 of the press chamber 3 relative to the storage chamber 14. It is new and particularly advantageous in connection with the starter roller 19 of the round baler 1 of the illustrated embodiment that, on the one hand, there is the possibility of height adjustment of the roller 19 so that the inlet 20 can be expanded or tightened and, on the other hand, a cover element 21 correlated with the starter roller 19 is provided that covers the roller 19 at its circumference in the area that is facing the storage chamber 14.

For a fast but gentle transfer of the round bales 4 from the press chamber 3 to the bale wrapping device 2, the round baler 1 is provided with a pivotable transfer device 22 which is arranged expediently and configured expediently such that in none of the operating positions it is at risk of colliding with other movable machine parts of the baler. Moreover, the transfer device 22 is driven such that after completed bale transfer it immediately assumes its upper initial position and in this way serves as a collecting depression for possible crumbled material and for harvested crop already passing into the press chamber, wherein the pressing device 18 of the press chamber 3 that is closing at the same time strips off this material and moves it into the press chamber 3 thus eliminating loss.

The interaction of all components of the round baler 1 according to the invention, controlled by a control and governing device of the round baler 1, will be explained in more detail with the aid of a press cycle illustrated in various phases in FIGS. 1 to 5.

FIG. 1 shows a schematic side view of a continuously operating round baler 1 according to the invention in an operating position that represents the normal pressing or baling operation. The picked-up harvested crop is directly passed through the storage chamber 14 into the press chamber 3. At least the lower, and advantageously both, conveyors 15, 16 of the storage chamber 14 operate in the conveying direction toward the press chamber 3. The lower conveyor (bottom conveyor) 15 and the starter roller 19 are in the upper position. In the press chamber 3, the bale 4 is pressed continuously by continued winding to the desired or given size.

FIG. 2 shows the round baler 1 in the next operating position which represents the initial phase of the storage operation. The pressed bale 4 has reached a predetermined size and density. The net for tying the bale 4 is injected into the bale chamber 3. In order to avoid harvested crop inclusions between the net layers, the conveyors 15, 16 stop further supply of harvested crop into the press chamber 3. Depending on the parameters, the drive action is briefly stopped for this purpose and then reversed, or the drive action is immediately reversed. Their conveying action opposite to the flow of harvested crop in the direction toward the conveying and cutting device 11 causes the harvested crop that is already in the storage chamber 14 to be combined with the harvested crop that is continuously conveyed by the conveying and cutting device 11 into the storage chamber 14. Accordingly, a significant pre-compression is achieved. The harvested crop that is continuously conveyed into the storage chamber 14 is pressed under pressure in the direction of the press chamber 3 wherein, due to the advantageous wedge-shaped configuration of the storage chamber 14, it is additionally compressed and in this way is caused to hold together. The storage chamber conveyors 15, 16 assist in this action, in particular as a function of the predetermined and detected harvested crop parameters with respect to the crop compressibility. This has the result that they are driven stepwise or continuously in the flow direction of the harvested crop, but also opposite to the flow direction of the harvested crop, or are not driven at all. The bottom conveyor 15 and the starter roller 19 are still in the upper positions during this phase.

FIG. 3 shows the next phase of the storage process. At a point in time that is determined by the control and governing device and/or by baler conditions that are detected by sensors, the bottom conveyor 15 is moved into the lower position. The storage volume is significantly increased in this way and overload by a pre-compression that is too high is avoided and the continued storage operation is ensured. The storage chamber conveyors 15, 16 are controlled further as described before.

FIG. 4 shows the storage process in its end phase. The tying process in the press chamber 3 is completed. The bale press chamber 3 is automatically opened and the bale 4 ejected. Directly after leaving the press chamber 3, the round bale 4 is received gently by the transfer device 22 and in a controlled fashion is transferred farther to the bale wrapping device 2 for positioning on the wrapping table 23. With properly selected spacings and height differences this transfer is realized in an operationally very safe way simply by the weight force of the bale 4. The storage chamber 14 is now completely filled up to the inlet 20 of the pressing chamber 3 by optimal adjustment of the processing sequences. The starter roller 19 that is still in the upper position delimits the inlet 20 to a minimum and, at the same time, retains the harvested crop which is stored in the storage chamber 14 by means of the cover element 21 correlated with the starter roller 19.

FIG. 5 represents the round baler 1 in an operating position during the phase of emptying the storage chamber. Already during bale transfer, as soon as the bale 4 is in a position in which collision with the bale press chamber 3 as it is being closed is impossible, the chamber 3 will close again. Already during the closing process, the starter roller 19 is transferred with the correlated cover element 21 into the lower position. With this displacement of the starter roller 19, the inlet opening 20 of the bale press chamber 3 expands at least to the complete cross-section of the storage chamber 14 that has been expanded at its end that is nearest the press chamber 3 by means of the downwardly moved bottom conveyor 15. As illustrated in FIG. 5, the starter roller 19 that has been moved downwardly forms together with the bottom conveyor 15 of the storage chamber 14 that has also been moved downwardly and together with the pressing device 18 of the press chamber 3, closed in the meantime, that is immediately adjacent to the starter roller 19 an optimal conveying stretch for unhindered transfer, as fast as possible, of the intermediately stored harvested crop packet 24 from the storage chamber 14 into the press chamber 3. The starter roller 19 becomes the conveying member 19 in this phase. By lowering the starter 19, the area of the starter roller 19 that, by means of the cover element 21 functions as a blocking device for the storage chamber 14, is no longer positioned in the flow of the harvested crop and is thus without any effect. For a transfer of the harvested crop packet 24 as fast as possible and as continuous as possible, the bottom conveyor 15 and the top conveyor 16 of the storage chamber 14 are adjusted in such a way to the conveying/revolving speed of the pressing device 18 and of the starter roller 19 that the intermediately stored harvested crop is pushed by the conveyors 15, 16 as a packet 24 into the press chamber 3. Here it is received by the pressing device 18, immediately caused to rotate and then used as a bale core for the subsequently supplied harvested crop for continuing the bale formation. In FIG. 5 it is apparent how advantageous the use of a round baler 1 with semi-variable bale chamber 3 is. The harvested crop packet 24 that is transferred from the storage chamber 14 into the chamber 3, whose volume is matched precisely to the storage volume, has no opportunity to expand and to dissolve or unravel. After transfer of the pre-compressed contiguous harvested crop packet 24 into the starting chamber 17 of the pressing device 18, the pressing device 18 is already filled and can expand only with additional compression acting onto the harvested crop.

Immediately after emptying of the storage chamber 14 the bottom conveyor 15 and the starter roller 19 are displaced into their upper normal position, as illustrated in FIG. 1. A new bale forming cycle begins. At the same time, the round bale that has already been produced beforehand is wrapped on the wrapping table 23 of the wrapping device 2 with film and is deposited on the field in due time before completion of the next bale. Operation of the round baler 1 provided with a bale wrapping device 2 purely by pressing operation, i.e., without wrapping of the bale in film, is of course possible also.

Even though the invention has been explained with the aid of an embodiment of a round baler 1 with semi-variable press chamber 3 and downstream bale wrapping device 2, the invention is usable in the same way or in a modified way by modifications within the knowledge of a person of skill in the art also in connection with round balers with other press chambers and also without bale wrapping device.

While specific embodiments of the invention have been shown and described in detail to illustrate the inventive principles, it will be understood that the invention may be embodied otherwise without departing from such principles.

What is claimed is:

1. A method for controlling flow of harvested crop in an agricultural round baler for forming a round bale of harvested crop, the round baler comprising a press chamber having an inlet and a rear outlet for ejecting a completed round bale; a pressing device disposed in the press chamber and adapted to rotate the harvested crop; a harvested crop pickup device; a conveying and cutting device downstream of the pickup device; a storage chamber arranged downstream of the conveying and cutting device and extending to the inlet of the press chamber, wherein the storage chamber receives harvested crop in a storage phase of the baler operation of the round baler; an element adapted to interrupt or release a flow of harvested crop from the storage chamber to the press chamber; a control and governing device acting on the element; a tying device that ties a completed round bale with a tying material in the press chamber, wherein the storage chamber is a flat shaping and pressing channel for the harvested crop conveyed in the storage phase of the baler operation into the storage chamber, wherein the channel has at least temporarily a tapering cross-section that tapers in a flow direction of the harvested crop from the conveying and cutting device to the press chamber, wherein the channel has at least one end that is height-adjustable; the method comprising the step of:

controlling by time control with the control and governing device of the round baler, based on a stored theoretical minimum time for pressing a harvested crop bale defined by predetermined parameters and based on actually determined harvested crop parameters, a harvested crop flow at any time of the bale forming process of the round baler such that the harvested crop bale defined by the predetermined parameters is produced at maximum baler utilization in a nominal press time determined for said harvested crop bale.

2. The method according to claim 1, further comprising the steps of:

continuously comparing temporally in the control and governing device a nominal value and an actual value of a travel speed of the round baler as a function of an actual bale diameter during bale growth and generating a nominal value signal of the travel speed;

providing the nominal value signal to a drive unit or a tractor of the round baler.

3. The method according to claim 2, further comprising the step of automatically controlling the travel speed of the drive unit or the tractor based on the nominal value signal.

* * * * *